United States Patent [19]

Varaprath et al.

[11] Patent Number: 5,246,734
[45] Date of Patent: Sep. 21, 1993

[54] AMORPHOUS SILICON HERMETIC COATINGS FOR OPTICAL WAVE GUIDES

[75] Inventors: Sudarsanan Varaprath; Forrest O. Stark; Keith W. Michael, all of Midland, Mich.

[73] Assignee: Dow Corning Corporation, Midland, Mich.

[21] Appl. No.: 503,076

[22] Filed: Apr. 2, 1990

Related U.S. Application Data

[63] Continuation of Ser. No. 348,071, May 5, 1989, abandoned, which is a continuation of Ser. No. 94,577, Sep. 9, 1987, abandoned, which is a continuation of Ser. No. 859,679, May 5, 1986, abandoned.

[51] Int. Cl.$^5$ .................. B05D 5/06; C23C 16/24; G02B 6/12
[52] U.S. Cl. .................. 427/166; 427/165; 427/163; 427/255.1; 427/255; 427/248.1; 385/130; 385/131
[58] Field of Search ............. 427/167, 166, 165, 164, 427/163, 255.1, 255, 248.1; 350/96.12, 96.3, 96.1, 96.34; 385/130, 131

[56] References Cited

U.S. PATENT DOCUMENTS

| | | | |
|---|---|---|---|
| 2,442,976 | 6/1948 | Henry | 427/167 |
| 2,788,280 | 4/1957 | Rust et al. | 427/248.1 |
| 3,540,919 | 11/1970 | Bracken | 427/255.1 |
| 3,809,571 | 5/1974 | Berlat | 427/248.1 |
| 4,064,521 | 12/1977 | Carlson | 427/248.1 |
| 4,123,989 | 11/1978 | Jewett | 427/255.1 |
| 4,138,509 | 2/1979 | Ingle et al. | 427/255 |
| 4,170,667 | 10/1979 | Rodgers | 427/248.1 |
| 4,196,438 | 4/1980 | Carlson | 427/39 |
| 4,217,148 | 8/1980 | Carlson | 427/39 |
| 4,217,374 | 8/1980 | Ovshinsky et al. | 427/248.1 |
| 4,225,367 | 9/1980 | Anglerot | 427/255.1 |
| 4,295,869 | 10/1981 | Shiraishi et al. | 427/163 |
| 4,295,870 | 10/1981 | Schneider et al. | 427/163 |
| 4,347,069 | 8/1982 | Haney et al. | 427/163 |
| 4,466,992 | 8/1984 | Dreiling | 427/255.1 |
| 4,469,045 | 9/1984 | Chesworth | 427/255 |
| 4,634,605 | 1/1987 | Wiesmann | 427/255 |
| 4,695,122 | 9/1987 | Ishida et al. | 350/96.12 |
| 4,715,672 | 12/1987 | Duguay et al. | 350/96.12 |
| 4,737,946 | 4/1988 | Yamashita et al. | 350/96.11 |

FOREIGN PATENT DOCUMENTS

| | | | |
|---|---|---|---|
| 0095729 | 12/1983 | European Pat. Off. | 427/162 |
| 2148328 | 5/1985 | United Kingdom | 427/255.1 |

OTHER PUBLICATIONS

Tebo, "The Promise of the Future", Electro-Optics, Jun. 1983, pp. 41-46.
Nassau, "The Material Dispersion Zero in Infrared Optical Waveguide Materials", The Bell System Technical Journal, vol. 60, No. 3, Mar. 1981, pp. 327-337.
Chemical Abstracts, vol. 100, 72914g Mar. 10, 1984.

*Primary Examiner*—Roy King
*Attorney, Agent, or Firm*—Roger E. Gobrogge

[57] ABSTRACT

This invention relates to a method of forming amorphous silicon hermetic coatings on light conducting devices, including optical fibers, wave guides, light pipes, or cables. By the present invention, a halosilane, halodisilane or mixture of halosilanes is thermally decomposed in the vapor phase in the presence of a light conducting device to produce an amorphous silicon hermetic coating on the light conducting device.

2 Claims, No Drawings

AMORPHOUS SILICON HERMETIC COATINGS FOR OPTICAL WAVE GUIDES

This is a continuation of application(s) Ser. No. 07/348,071 filed on May 5, 1989, now abandoned, which is a continuation of Ser. No. 07/094,577 filed on Sep. 9, 1987, now abandoned which is a continuation of Ser. No. 06/859,679 filed on May 5, 1986, now abandoned.

BACKGROUND OF THE INVENTION

One of the most rapidly developing areas of electronic products research is that of optical fibers. Useful in optical scanning devices, holography, communication, and surgery, optical fibers are regarded as an extremely important part of our future.

A significant problem in utilizing optical fibers in many of the current and proposed applications is the need to coat the fibers with a material capable of providing moisture resistance, high temperature resistance, and abrasion resistance without a loss in flexibility, or marked increase in size or cost.

Amorphous silicon (hereinafter a—Si) films have been the subject of intense research for various applications in electronic industries. They have been, however, least explored with respect to optical fiber coating applications and only a few patents have appeared in the literature.

Thus, there is a need for a process for producing silicon-containing coatings for optical fibers at low equipment cost and with acceptable film characteristics and uniformity. Inorganic type coating materials, such as a—Si, for example, are highly desirable for such applications compared to organic polymer coatings, since the former is expected to provide excellent protection to optical fibers from moisture-related static and dynamic fatigue. The optical fiber coating of preference is one which has a refractive index significantly different from, and higher than, that of the optical fiber itself so as to promote diffraction and scattering of any light which may have escaped the fiber while being transmitted. For many applications utilizing optical fibers, it is most desirable to have a coating on the fibers which is a poor electrical conductor or an electrical non-conductor. Thus, non-metallic coatings are frequently preferred as coatings for optical fibers in these applications. Silicon-containing polymeric coatings can be deposited which are excellent in this regard as a result of their non-conductive character relative to metals for electromagnetic interference and electromagnetic pulse resistance.

The energy transmitted through the optical fiber is electromagnetic radiation which may include wavelengths outside the visible range. For purposes of this application, the electromagnetic radiation will be referred to as light. The light or energy which escapes from the core fiber does not contribute to the meaningful information transmission, and there is a need to prevent it from returning to the fiber core because it would be out of phase with the main signal. Preventing the light which has escaped from the fiber core from again entering the fiber core is usually accomplished by coating the fiber with a protective coating which has a higher refractive index than that of the fiber. This higher refractive index coating refracts or disperses the unwanted light away from the fiber core. Such coatings are often referred to as optical fiber coatings or wave guide coatings. Silicon coatings have very high refractive indices, on the order of 4.5 and thus are attractive as optical fiber coatings or wave guide coatings. "Wave guide" is another name applied to a device for conducting light and may be on a substrate other than a free standing fiber.

Chemical vapor deposition (CVD) is one of the most widely used deposition processes to coat surfaces. Conventional CVD process is based on thermochemical reactions such as thermal decomposition, chemical reduction, displacement and disproportionation reactions. CVD reaction products find applications in a wide variety of fields; providing hard coatings on cutting tools, protecting surfaces against wear, erosion, corrosion, high temperature oxidation, high temperature diffusion, solid state electronic devices, preparation of fibers made of composite materials, and hermetic coatings.

A number of possible processes have been disclosed up to now for depositing films. For instance, for producing films of amorphous silicon deposit, there have been tried the vacuum deposition process, plasma CVD process, CVD process, reactive sputtering process, ion plating process and photo-CVD process, etc. Generally, the plasma CVD process is industrialized and widely used for this purpose.

However, deposited films of amorphous silicon still admit of improvements in overall characteristics including electrical and optical properties, various characteristics of fatigue due to repeated uses or to environmental use conditions. In addition, productivity of depositing silicon-containing films presents problems in product uniformity, reproducibility, and mass-production.

The conventional plasma CVD process is regarded at the present time as the best method for the purpose of obtaining amorphous silicon films which have such electrical and optical properties so as to fulfill various application purposes. However, the conventional CVD process requires a high operational temperature and therefore is somewhat limited in applications and substrates.

Silicon-containing polymeric materials of silicon and hydrogen (hereafter referred to as a—SiH) have emerged as a new class of coatings in recent years. Such materials are described, for example, in D. Carlson, U.S. Pat. No. 4,064,521, issued on Dec. 20, 1976. The materials are generated as thin films from the decomposition of silane ($SiH_4$) in electrical discharges or, less frequently, from the thermal decomposition of silane or higher hydrogen-containing silanes (e.g., $Si_2H_6$, $Si_3H_8$, etc.) as described in a PCT patent application by A. MacDiarmid and Z. Kiss published as International Publication No. WO82/03069 dated Sep. 16, 1982.

U.S. Pat. No. 4,459,163, issued Jul. 10, 1984 to MacDiarmid and Kiss, teaches the preparation of amorphous semiconductor material that is suitable for use in a wide variety of devices by the pyrolytic decomposition of one or more gaseous phase polysemiconductanes, including polysilanes and polygermanes. However, U.S. Pat. No. 4,459,163 is directed toward the formation of semiconductor material and not optical fiber coating material.

U.S. Pat. No. 4,374,182, issued Feb. 15, 1983 to Gaul et. al., discloses decomposing halogenated polysilanes at an elevated temperature. Gaul et al., however, is limited to the pyrolysis of polychlorosilanes.

U.S. Pat. Nos. 2,606,811, issued on Aug. 12, 1952 to Wagner and 4,079,071, issued on Mar. 14, 1978 to Neale, addressed the decomposition at elevated temperatures of halogenated disilanes. However, these patents are distinguished from the instant invention because both are directed toward the hydrogenation of di- and polysilanes for the formation of silanes, and more specifically, monosilanes. Neither Wagner nor Neale teach the formation of optical fiber coatings produced by the vapor phase deposition of silicon-containing coatings from the thermal decomposition of halosilanes.

United Kingdom Patent No. 2,148,328, issued to M. Hirooka, et al., on May 30, 1985, teaches the decomposition of various silanes, including monomeric halosilanes ($Si_nX_{2n+1}$, where n=1), cyclic polymeric halosilanes ($SiX_2)_n$, where n is greater than or equal to 3, di- and polysilanes such as $Si_nHX_{2n+1}$ and $Si_nH_2X_{2n}$. These materials are decomposed via electric discharge, or photolysis, or high temperature or catalytically and, unlike the instant invention, mixed with a requisite second stream consisting of a vapor phase material selected from the group consisting of $H_2$, $SiH_4$, $SiH_3Br$, or $SiH_3I$ wherein the second stream has also been decomposed. The obvious disadvantage of such prior art, one which clearly distinguishes it from the instant invention, is the necessity of having two materials to decompose.

U.S. Pat. No. 4,372,648, issued Feb. 8, 1983, to Black describes an optical fiber in which there is a multitude of coatings of differing refractive index materials arranged in a specific order to provide an optical fiber which can be used as a secure communications transmissions line. The particular order of the refractive index materials in the fiber provides the ability to determine if the fiber has been tampered with to obtain the information being sent.

U.S. Pat. No. 4,512,629, issued Apr. 23, 1985 to Hanson et al. teaches the use of silicon and carbon containing coatings for the hermetic protection of optical fibers. Hanson et al., however, describes the Si—C bond in the coating as essential to the production of a hermetic corrosion resistant coating. The coatings of the instant invention do not require carbon, and in fact, organic groups in general and hydrogen are deleterious to the coatings claimed herein.

Organic coatings designed for the protection of optical fibers should have a high refractive index which effectively prevents the errant light from returning to the fiber core. Organic coatings for optical fibers, however, are used predominantly for cushioning to protect the fibers from mechanical or physical damage. In addition, organic coatings and polydimethylsiloxane coatings do not provide hermetic coatings capable of preventing moisture penetration. Furthermore, manufacturers of optical fiber cables try to minimize the use of materials which are known to generate hydrogen when the cables are in use. The desire to avoid hydrogen-liberating materials is due to the diffusion of hydrogen into the optical fiber core which leads to attenuation of signals. Since many thermally cured siloxane coatings release measurable amounts of hydrogen when exposed to moisture and elevated temperatures, these materials have a significant drawback.

Japanese Patent O.P.I. 48,001/83, published Mar. 19, 1983, by Aoki et al., described a method of coating a glass fiber with amorphous silicon by glow discharge.

U.S. Pat. No. 4,002,512, issued Jan. 11, 1977 to Lim, teaches a method of depositing a layer comprising $SiO_2$ on a surface of a substrate at a rate which is temperature independent whereby the method combines dichlorosilane with an oxidizing gas, such as oxygen, carbon dioxide, nitrous oxide, or water to form the $SiO_2$.

U.S. Pat. No. 4,149,867, issued Apr. 17, 1979 to Takeshi, et al., teaches a method for forming a $SiO_2$ "soot" on the optical fiber surface by CVD oxidizing certain starting materials.

Another method for depositing a silicon oxide coating on an optical fiber is that taught in U.S. Pat. No. 3,957,474, issued May 18, 1976 to Tatsuo, et al., comprising heating by means of a carbon dioxide laser, a mixture of oxygen, a dopant compound, and pure silicon tetrachloride vapor so as to deposit silicon oxide and an oxide of the dopant compound on a mandrel and to form a fiber by fusing the oxides.

SUMMARY OF THE INVENTION

The instant invention relates to the formation and deposition of unilayer silicon-containing hermetic coatings for optical fibers or optical wave guides from the vapor phase thermal decomposition of halosilanes, polyhalodisilanes, polyhalosilanes or mixtures thereof to provide optical fibers with excellent moisture resistance.

DETAILED DESCRIPTION OF THE INVENTION

The present invention relates to a method of forming unilayer silicon-containing hermetic coatings on a light conducting device, which method comprises decomposing in a reaction chamber a halosilane, halodisilane or mixture of halosilanes in the vapor phase, in the presence of a light conducting device, at a temperature in the range of 400 degrees C. up to the softening point of the light conducting device, wherein the halosilane, halodisilane, or halosilanes each contain at least one halogen atom selected from the group consisting of fluorine, chlorine, bromine, and iodine, whereby light conducting device with a silicon-containing coating thereon is obtained. The instant invention produces in a single step, highly colored, reflective, air-stable silicon-containing hermetic coatings from the vapor phase decompostion of various halosilanes. The hermetic coatings of the instant invention are deposited in the presence, and in some cases, depending on the starting silane, in the absence of metal catalysts. Thus, for example, tetrachlorosilane, $SiCl_4$, requires metal catalysis under the instant invention to produce hermetic coatings for optical fibers, while the thermal decompositions of trichlorosilane, $HSiCl_3$, difluorosilane, $H_2SiF_2$, dichlorosilane, $H_2SiCl_2$, hexachlorodisilane, $Si_2Cl_6$, and hexafluorodisilane, $Si_2F_6$, do not require metal catalysis to produce hermetic optical fiber or optical wave guide coatings under the present invention.

By "light conducting device" in the instant invention is meant optical fiber, optical wave guide, optical cable or pipe, or other optically transmissive media or coating.

The light conducting device coatings produced by the instant invention exhibit strong adhesion to the optical substrate, are abrasion resistant, moisture resistant, and are strong absorbers of visible light. Additional secondary metallic coats, as employed in the prior art, are not needed. The invention further relates to a method of making a scratch resistant protective hermetic coating on a light conducting device which method comprises decomposing in a reaction chamber a halosilane, halodisilane, or mixture of halosilanes in the vapor phase, in the presence of a light conducting device, at a temperature in the range of 400 degrees C. up to the softening point of the light conducting device, but preferably up to 600 degrees Centigrade, wherein the halosilane, halodisilane, or halosilanes each contain at least one halogen atom selected from the group consisting of fluorine, chlorine, bromine, and iodine, whereby a light conducting device with a silicon-containing hermetic coating thereon is obtained. The present invention also relates to a method of making a high temperature resistant hermetic coating on a light conducting device which method comprises decomposing in a reaction chamber a halosilane, halodisilane, or mixture of halosilanes in the vapor phase, in the presence of a light conducting device, at a temperature in the range of 400 degrees to 1000 degrees Centigrade or up to the softening point of the light conducting device, wherein the halosilane, halodisilane, or halosilanes each contain at least one halogen atom selected from the group consisting of fluorine, chlorine, bromine, and iodine, whereby a light conducting device with a silicon-containing hermetic coating thereon is obtained. Thus silicon-containing hermetic coatings have been conveniently deposited by the instant invention on a variety of optical fibers. The process of the present invention provides coatings of thicknesses which can be varied as desired depending upon the concentration of the silicon halides that are being reacted. Thus, increasing the silane monomer concentration three-fold resulted in a two-fold increase in the thickness of amorphous silicon deposited.

Examples of halosilanes which can be utilized in the instant invention include the following and mixtures hereof;

|         | $SiCl_4$   |          | $SiBr_4$   |
|---------|------------|----------|------------|
| $HSiI_3$  | $HSiCl_3$  | $HSiF_3$ | $HSiBr_3$  |
| $H_2SiI_2$ | $H_2SiCl_2$ | $H_2SiF_2$ | $H_2SiBr_2$ |
| $H_3SiI$  | $H_3SiCl$  | $H_3SiF$ | $H_3SiBr$  | as well as halosilanes with more than one type of halogen such as $Cl_2SiF_2$, $ClSiF_3$, $Cl_2SiBr_2$, $F_2SiBr_2$, and $Cl_2SiI_2$. The halosilanes possessing more than one type of halogen which are serviceable in the present invention for the production of silicon-containing coatings can be described as those of the formula $SiX_mY_{(4-m)}$ where X and Y are selected from the class consisting of fluorine, chlorine, bromine, and iodine. Also serviceable in the present invention are halogenated disilanes, such as, for example $F_3SiSiF_3$.

Thus one example of the instant invention can be depicted in the following equation;

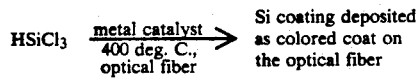

$$HSiCl_3 \xrightarrow[\text{optical fiber}]{\text{metal catalyst} \atop 400 \text{ deg. C.,}} \text{Si coating deposited as colored coat on the optical fiber}$$

However, at temperatures above 500 degrees Centigrade no metal catalyst is needed for the deposition of the coating.

The silicon-containing hermetic coatings of the present invention exhibit excellent thermal stability and are stable to air and moisture. There was no observable adverse effect on the silicon-containing coating on the optical fibers after immersion in concentrated sulfuric acid or nitric acid. The thermal stability of the optical fiber coatings of the instant invention has been demonstrated up to at least 600 degrees Centigrade for a minimum of 2 and ½ days in a nitrogen atmosphere and twenty-four hours in air. Coating thickness can be varied by adjusting the vapor pressure of the precursor silane prior to the thermal decomposition. Tensile strengths of optical fibers coated with silicon-containing coatings did not subside after exposure to moisture of 100% relative humidity. In addition, the CVD process does not introduce flaws or degrade the optical fibers.

In the conventional CVD process of the prior art, fully halogenated silane monomers, such as $SiCl_4$, resist silicon-containing coating deposition except under reducing conditions, such as hydrogen atmosphere. Application of the instant invention, however, using $SiCl_4$ results in silicon-containing coating deposition containing no dangling silicon-hydrogen moieties. Such coating material is highly desirable on optical fibers to minimize optical attenuation.

In the practice of the instant invention, halosilane, halodisilane, or mixtures of various halosilanes are placed in a glass container along with a light conducting substrate to be coated with a silicon-containing coating. Both the container and substrate are preferably first cleaned (e.g., in an alkaline detergent) and rinsed with a highly purified solvent, preferably water or "electronic grade" methanol. The container is then attached to a vacuum line, the contents evacuated, and the container thoroughly heated under vacuum, with, for example, a gas-oxygen torch. The halosilane is transferred to the glass container in such a manner as to preclude exposure to the atmosphere. The container is sealed with a natural gas-oxygen torch and heated in an oven or furnace for a time generally in the range of 10 to 60 minutes at a temperature in the range of from 400 degrees Centigrade to the softening point of the optical media, preferably in the range of 400 to 600 degrees C., and most preferably in the range of from 400 degrees Centigrade to 450 degrees Centigrade. During this time the starting material decomposes and forms a silicon-containing coating on the light conducting substrate. Then, the reaction by-products, mixtures of various halosilanes and any unreacted starting material, may conveniently be removed by evacuation after the container has been reattached to the vacuum line. The light conducting substrate, onto which the decomposed halosilane starting material has deposited a silicon-containing coating, is then removed. The resulting coatings are highly colored, reflective, air-stable, abrasion resistant, moisture resistant silicon-containing coatings possessing high thermal stability and low defect density.

The optical fiber substrates serviceable in the instant invention are limited only by the need to produce a light transmitting fiber, waveguide, cable, pipe or media. Examples of such substrate materials include, but are not limited to, silicon dioxide, silicon oxide, silicon halide, lead halide, titanium halide, germanium halide, germanium oxide, germanium dioxide, gallium oxide, aluminum oxide, titanium dioxide, titanium oxide, boron oxide, boron dioxide, boron halide, phosphorous oxides, and mixtures thereof. Additionally, chalcogenic glasses are serviceable in the present invention as the optical media substrate to be coated.

Silicon-containing optical fiber coatings prepared from difluorosilane by the instant invention have band gaps comparable to those of conventional amorphous -SiH containing coatings, but are not degraded phenomenologically, chemically, or electrically at temperatures where coatings of the purely hydrogenated silicon material are destroyed.

Coatings produced by the instant invention are useful in photovoltaics, passive optical layers, active optical layers, corrosion resistant coatings, abrasion resistant coatings, hermetic coatings, optical fiber coatings, and high temperature resistant coatings.

For use in the following examples, diiodosilane was prepared as follows; Diphenylsilane (1 equivalent) was placed in a heavy walled Pyrex ® tube (10"×1") equipped with a teflon ® valve with a Viton ® (reg. TM) "O"-ring. The system was cooled in liquid nitrogen and degassed. Dry hydrogen iodide gas (6 equivalents) was condensed into the Pyrex ® tube. The Pyrex ® tube was closed and kept cold in an ethylene glycol/dry ice bath for six days. The reaction vessel was periodically removed from the cold bath and shaken. After the reaction had progressed for six days, excess hydrogen iodide was removed by distillation at 120 mm Hg pressure. The by-product benzene was removed at 30 mmHg pressure. Proton NMR analysis of the reaction product exhibited a singlet at 4.06 ppm indicating SiH.

In the following examples, the surface to be coated was prepared as follows; The Pyrex ® container and the optical fiber used in the deposition process were cleaned using "DeContam" (manufactured by Electronic Space Products, Inc., Los Angeles, Calif.) following the manufacturer's directions. The container and the optical fiber were either soaked in the "DeContam" solution (200 milliliters of "DeContam" in 1 quart of water) for about 3-5 hours at room temperature or kept in a boiling solution for a few minutes before thoroughly rinsing with deionized water. After the water was decanted, the optical fiber was dried in an oven. Metal foil used catalytically in some of the following examples was cut to fit the inside wall of the Pyrex ® reaction tube, was cleaned successively with toluene and isopropyl alcohol, and was dried using aerosol duster (dichlorodifluoromethane gas).

EXAMPLE 1

CVD Process in Closed Container

Optical fibers were placed inside a heavy walled Pyrex ® reaction container. The container and its contents were flame dried under vacuum. After the container and the contents attained room temperature, the container was filled with the appropriate halosilane at the desired vapor pressure, for example >10 mmHg. The amount of silicon-containing coating deposited on the substrate is directly related to the vapor pressure in the reaction vessel of the starting silane. The system was isolated from the rest of the vacuum line, cooled in a liquid nitrogen bath, and degassed. The container was sealed under vacuum ($10^{-5}$ mmHg), placed in a tube furnace and heated for an hour to 550 degrees C. when using $SiCl_4$, or 450 degrees C. when using $H_2SiCl_2$. The process resulted in the formation of a highly reflective and multicolored (mostly golden in appearance) silicon-containing optical fiber hermetic coating.

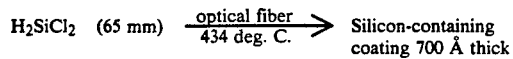

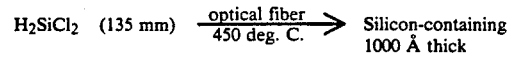

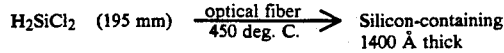

EXAMPLE 2

Metal Assisted CVD Process in a Closed Container

Using the procedure described in Example 1, except in the presence of cleaned aluminum foil positioned inside the reaction container, halosilane ($SiCl_4$) was thermally decomposed to produce silicon-containing hermetic coatings on optical fibers. The amount of silicon-containing hermetic coating deposited on the optical fiber is directly related to the vapor pressure in the reaction vessel of the starting silane, as shown in Table I.

TABLE I

| Starting Material | Vapor Pressure | Conditions | Temperature | Coating Thickness |
|---|---|---|---|---|
| $SiCl_4$ | 65 mm Hg | Aluminum foil catalyzed | 550° C. | 700 Å |
| $SiCl_4$ | 135 mm Hg | Aluminum foil catalyzed | 550° C. | 1000 Å |
| $SiCl_4$ | 195 mm Hg | Aluminum foil catalyzed | 550° C. | 1400 Å |
| $H_2SiCl_2$ | 65 mm Hg | Aluminum foil catalyzed | 434° C. | 700 Å |

EXAMPLE 3

CVD Process in a Flow Reactor

Commercial optical fibers, obtained from Corning Glass Works, Corning, N.Y., were cut to approximately 2 inch lengths and were immersed in dry methylene chloride. The acrylate coating on the optical fibers was then easily peeled off the fibers and the fibers were dried in an oven at 100 degrees Centigrade for 10 minutes. The dried fibers were then removed from the oven and placed in a quartz tube equipped with an inlet port and an outlet port. The quartz tube was then positioned in a tube furnace. The inlet port was attached to the source of the silane monomer and the outlet port was connected to a digital manometer and to a vacuum line through a series of cold traps. The quartz tube, which served as the reaction vessel, and its contents were heated to the deposition temperature (550° C. for example $SiCl_4$ and in the presence of aluminum foil catalyst) before admitting the halosilane. The halosilane was then fed into the quartz glass reaction vessel continually by applying vacuum. The vapor pressure of the silane, recorded by the digital manometer, was controlled by micrometer valves on the outlet port of the reaction vessel. The vacuum in the main vacuum line was generally held to around $10^{-4}$ mm Hg. Volatile by-products were trapped at liquid nitrogen temperatures in the cold traps. The flow of the halosilane was continued until the desired coating thickness on the optical fiber substrate was obtained. The coatings showed no visible degradation after 60 hours at 600 degrees C. in nitrogen atmosphere and after 24 hours at 600 degrees C. in air. No visible effect was detected in the coatings after immersion in concentrated sulfuric acid, nitric acid, and hydrogen chloride for thirty days each at room temperature. The coatings exhibited a pencil hardness of 9H and environmental stability toward air and moisture.

EXAMPLE 4

Metal Assisted CVD Process in a Flow Reactor

Using the procedure described in Example 3, silicon tetrachloride was thermally decomposed to deposit on optical fiber substrates, in the presence of aluminum foil catalyst, colored silicon-containing hermetic coatings. Electron scattering for chemical analysis data from the coating produced by the CVD deposition of $SiCl_4$ indicated silicon species present in reduced form.

In a similar manner, dichlorosilane was thermally decomposed to deposit on optical fiber substrates in the presence of an aluminum foil catalyst, metallic, golden-colored coatings.

Metal assisted CVD of silicon onto optical fiber substrates was achieved with the catalytic use of aluminum, copper, magnesium, chromium, zirconium and stainless steel. See Table II.

TABLE II

Silicon-Containing Coating Produced by Metal-Assisted CVD Process

| Silane Monomer | Metal Catalyst | Monomer Concentration $P_{monomer}$, mm | Pyrolysis Condition °C. | Results Silicon-Containing Coating |
|---|---|---|---|---|
| $H_2SiI_2$ | Al | 10 | 550 | x |
| $H_2SiI_2$ | Cu | 5 | 550 | x |
| $H_2SiI_2$ | Cr | 5 | 550 | x |
| $H_2SiI_2$ | Stainless Steel | 5 | 550 | x |
| $H_2SiCl_2$ | Al | 65 | 434 | x |
| $HSiCl_3$ | Al | 65 | 434 | x |
| $SiCl_4$ | Al | 65 | 550 | x |
| $HSiCl_3$ | Mg | 65 | 440 | x |
| $SiCl_4$ | Zr | 65 | 550 | x |

EXAMPLE 5

Using a procedure similar to that described in Example 1, difluorosilane, $H_2SiF_2$, was thermally decomposed (550 degrees C.) and a colored, silicon-containing hermetic coating was deposited onto optical fibers.

That which is claimed is:

1. A method for forming a unilayer amorphous silicon hermetic coating on an optical wave guide, which method comprises decomposing in a reaction chamber a halosilane, halodisilane, or mixture of halosilanes in the vapor phase, in the presence of the optical wave guide and a metal catalyst, and in the absence of oxygen, at a temperature in the range of 400° C. up to the softening point of the optical wave guide, wherein the halosilane, halodisilane, or halosilanes each contain at least one halogen atom selected from the group consisting of fluorine, chlorine, bromine, and iodine, and whereby the optical wave guide with the amorphous silicon hermetic coating thereon is obtained.

2. A method as claimed in claim 1, wherein the metal catalyst is selected from the group consisting of aluminum, copper, magnesium, chromium, zirconium, and stainless steel.

* * * * *